United States Patent
Gray

(10) Patent No.: US 11,199,261 B2
(45) Date of Patent: Dec. 14, 2021

(54) PLAY-FREE OIL SCRAPER RING

(71) Applicant: FEDERAL-MOGUL BURSCHEID GMBH, Burscheid (DE)

(72) Inventor: Nigel Gray, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 147 days.

(21) Appl. No.: 16/497,083

(22) PCT Filed: Nov. 9, 2017

(86) PCT No.: PCT/EP2017/078730
§ 371 (c)(1),
(2) Date: Sep. 24, 2019

(87) PCT Pub. No.: WO2018/177574
PCT Pub. Date: Oct. 4, 2018

(65) Prior Publication Data
US 2020/0378498 A1 Dec. 3, 2020

(30) Foreign Application Priority Data
Mar. 31, 2017 (DE) .................. 10 2017 107 009.5

(51) Int. Cl.
*F16J 9/06* (2006.01)
*F16J 9/20* (2006.01)
*F02F 5/00* (2006.01)

(52) U.S. Cl.
CPC .............. *F16J 9/062* (2013.01); *F16J 9/203* (2013.01); *F02F 5/00* (2013.01); *F16J 9/066* (2013.01); *F16J 9/206* (2013.01)

(58) Field of Classification Search
CPC ...... F16J 9/06; F16J 9/061; F16J 9/062; F16J 9/203; F16J 9/206; F02F 5/00
See application file for complete search history.

(56) References Cited

U.S. PATENT DOCUMENTS 2,631,908 A * 3/1953 Teetor ..................... F16J 9/206
277/462
4,497,497 A * 2/1985 Berti ....................... F16J 9/062
267/1.5

(Continued)

FOREIGN PATENT DOCUMENTS

| DE | 357 024 C | 8/1922 | |
| GB | 792 922 A | 4/1958 | |
| JP | 08312778 A * | 11/1996 | .............. F16J 9/062 |

*Primary Examiner* — Nicholas L Foster
(74) *Attorney, Agent, or Firm* — Robert L. Stearns; Dickinson Wright, PLLC

(57) ABSTRACT

A play-free oil scraper ring has a cross section with a running surface leg having at least one scraper web that is situated on a running surface, an upper piston ring flank leg that is connected to the running surface leg, and the upper surface of which forms an upper piston ring flank. A lower piston ring flank leg is likewise connected to the running surface leg, the lower surface of which forms a lower piston ring flank. The upper and/or the lower piston ring flank leg are/is elastic, taper(s) inwardly in the radial direction, and their/its piston ring flank(s) essentially form(s) a conical surface in an uninstalled state. The uninstalled piston ring has an axial height that exceeds a width of a piston ring groove for which the piston ring is intended.

16 Claims, 7 Drawing Sheets

(56) References Cited

U.S. PATENT DOCUMENTS

| | | | | |
|---|---|---|---|---|
| 4,522,412 A | * | 6/1985 | Kubo | F16J 9/062 |
| | | | | 277/443 |
| 4,796,898 A | * | 1/1989 | Brauers | F16J 9/062 |
| | | | | 267/1.5 |
| 2013/0049305 A1 | * | 2/2013 | Miyamoto | F16J 9/26 |
| | | | | 277/467 |

* cited by examiner

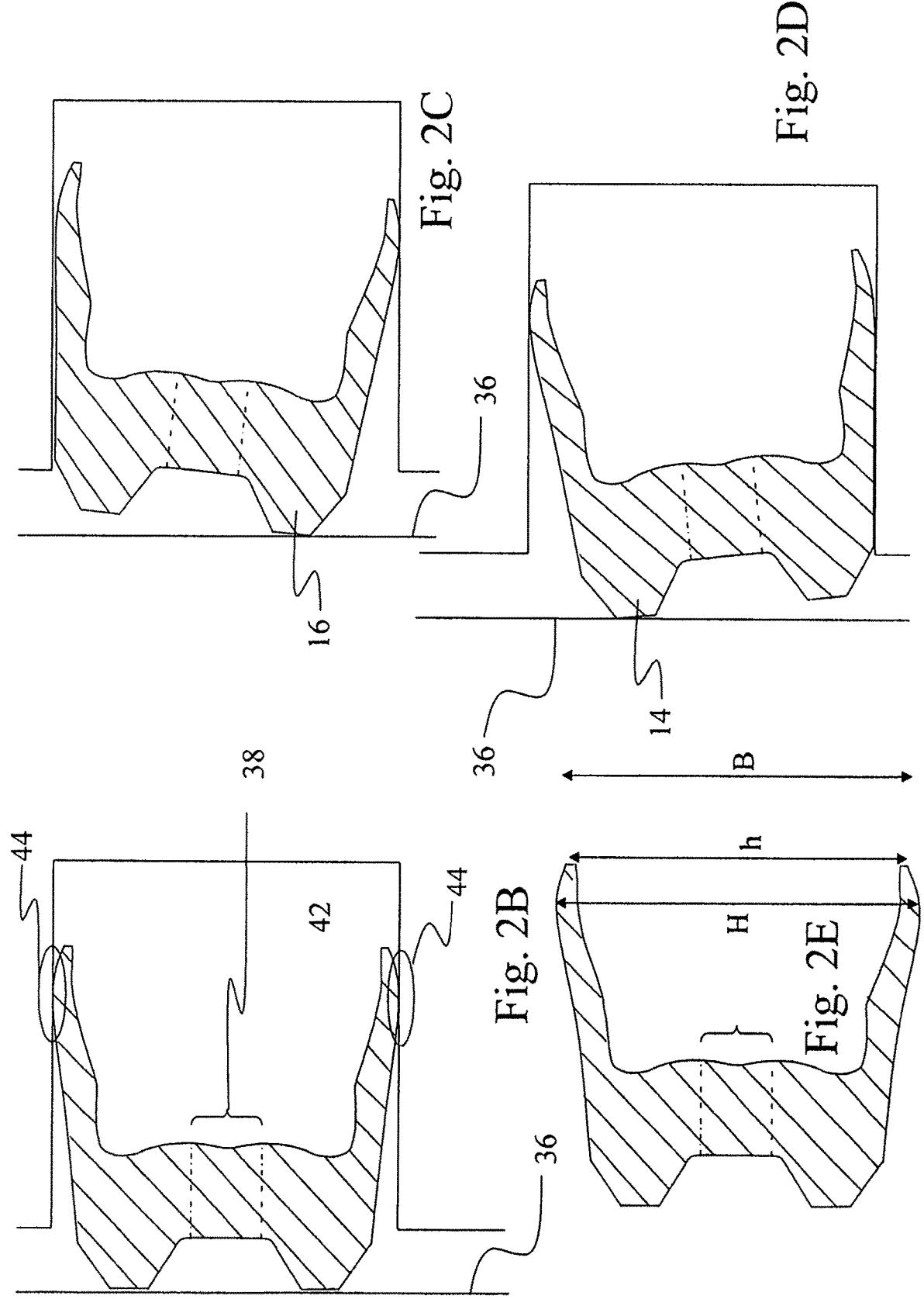

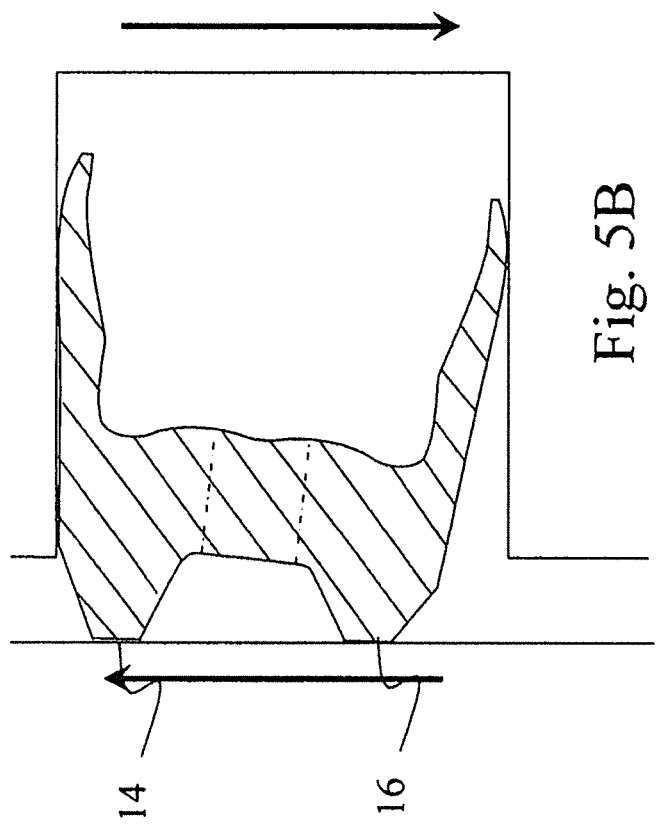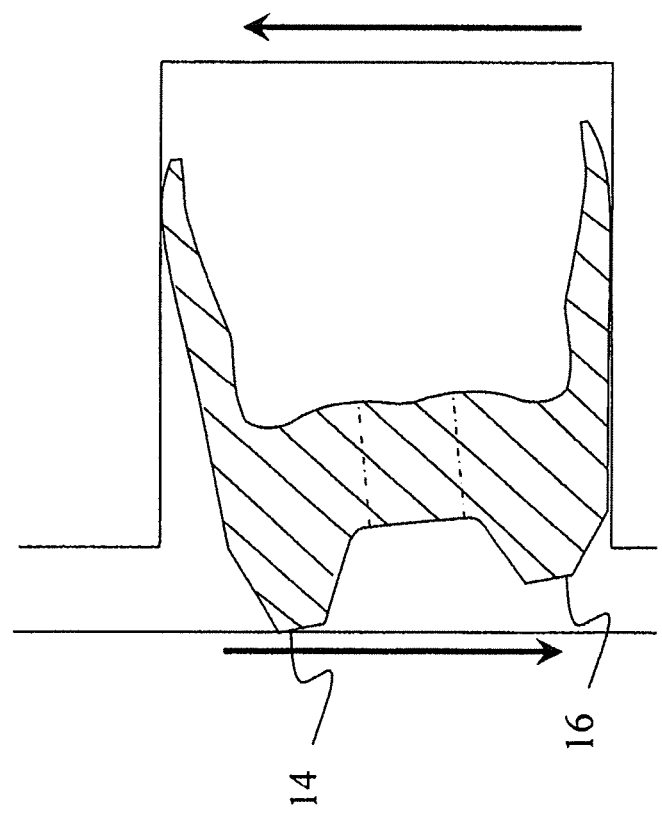
Fig. 5A
Fig. 5B

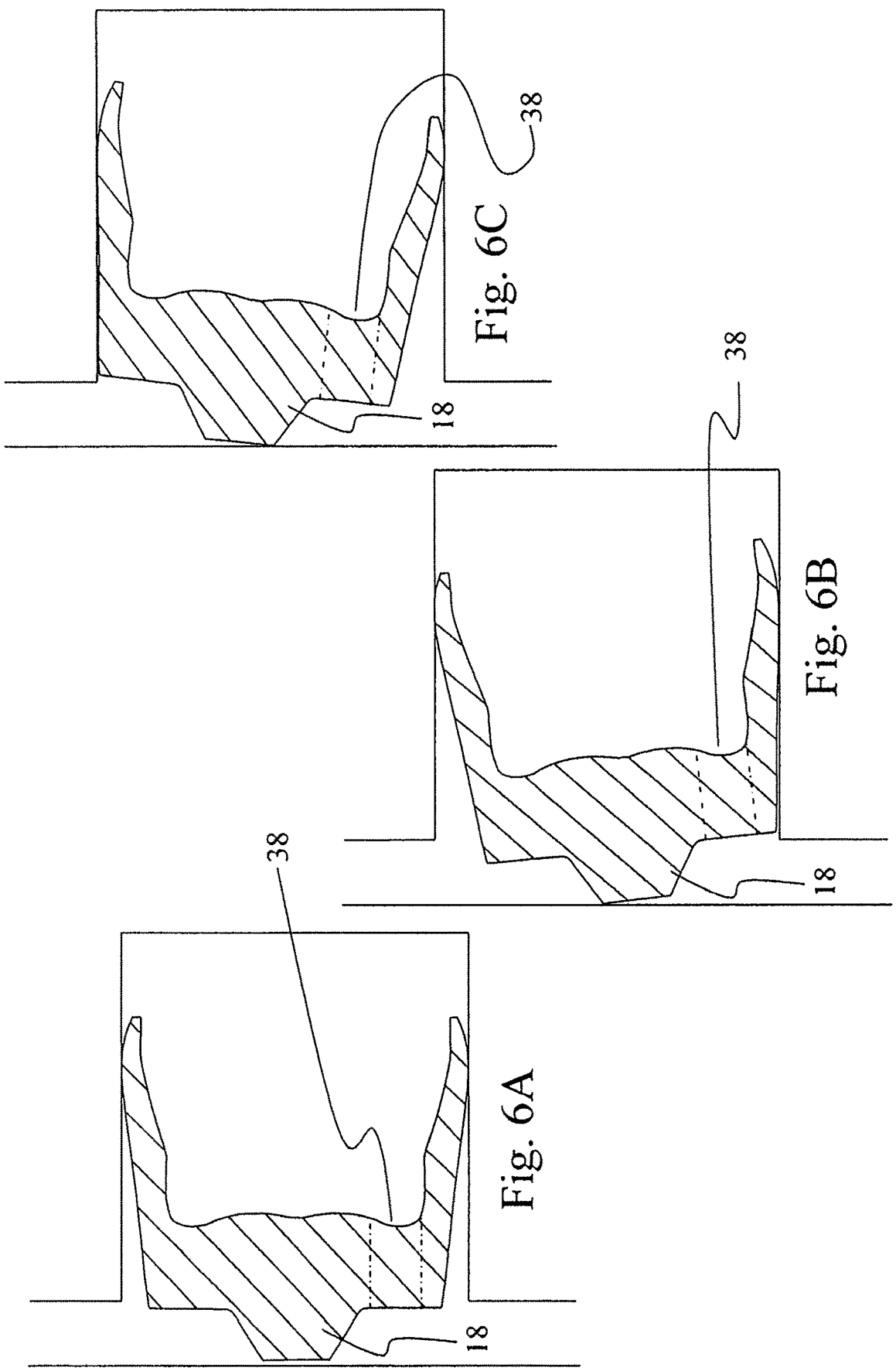

PLAY-FREE OIL SCRAPER RING

BACKGROUND

1. Technical Field

The present invention relates to a play-free oil scraper ring that allows improved discharge of scraped oil. During operation, the oil scraper ring with at least a portion of both ring flanks always rests against the piston ring groove flanks.

2. Related Art

Oil scraper rings of various designs are known. During operation, piston rings are generally intended to move in the piston ring groove to avoid one-sided wear at the abutment point. Three-part oil scraper rings are also known. Three-part oil scraper rings are more effective than conventional one-part or two-part oil scraper rings, in particular due to the fact that under conditions in which a lower pressure prevails in the combustion chamber than in the crankcase, they can reliably scrape off an oil film, since they have no gap between the flanks of the piston ring groove and the flanks of the scraper rings. In conventional oil scraper rings, due to the axial play, oil may enter through the gaps between the flanks of the piston ring and the piston ring groove, and under the conditions described above may pass into the combustion chamber.

Three-part oil scraper rings show an excellent oil scraping effect in all operating states, but with regard to manufacturing and installation, they have considerable cost and handling disadvantages compared to conventional piston rings.

SUMMARY

Therefore, it is desirable to have an economical one- or two-part oil scraper ring that allows an excellent oil scraping effect, even under shear conditions.

The present invention provides an axial-play-free oil scraper ring, the cross section of which comprises a running surface leg, an upper piston ring flank leg, and a lower piston ring flank leg, wherein the upper and/or the lower piston ring flank leg are/is elastic. The running surface leg includes at least one scraper web that is situated on a running surface. The upper piston ring flank leg is connected to the running surface leg, and its upper face forms an upper piston ring flank. The lower piston ring flank leg is likewise connected to the running surface leg, and its lower face forms a lower piston ring flank.

The upper and/or the lower piston ring flank leg are/is elastic and taper(s) inwardly in the radial direction, and their/its piston ring flank(s) essentially form(s) a conical surface in an uninstalled state. The conical surface ascends inwardly in the radial direction, so that the generated cone of the piston ring flank truncated cone surface, which is delimited by the line of intersection of the running surface with the piston ring flank, up to its tip does not intersect an annular surface situated at one-half the height of the piston ring. The uninstalled piston ring additionally has an axial height that exceeds a width of a piston ring groove for which the piston ring is intended.

In one preferred exemplary embodiment of the play-free oil scraper ring, the scraper ring is provided with a scraper web or a lower scraper web, and also includes oil channels situated below the scraper web or the lower scraper web. In versions with only one scraper web, it is necessary to provide the oil channels below the one oil scraper ring.

In another embodiment, the running surface leg is provided with two scraper webs. Another exemplary embodiment additionally has oil channels between the upper scraper web and a lower scraper web.

Another exemplary embodiment of the oil scraper ring is further provided with oil channels situated between the upper and the lower scraper webs. Oil channels are thus situated above and below the lower scraper web.

In another exemplary embodiment, the upper and the lower piston ring flank legs each have an elastic design and taper inwardly in the radial direction. In this design, the piston ring flanks form essentially conical surfaces in an uninstalled state. The radially inner ends of the piston ring flank legs may deform in the cross section, and the oil scraper ring may be pretensioned and inserted into a corresponding piston ring groove.

In another embodiment of the play-free oil scraper ring, the upper (combustion chamber-side) piston ring flank leg is elastic and tapers inwardly in the radial direction. Here as well, the upper piston ring flank essentially forms a conical surface in an uninstalled state. The lower piston ring flank leg is essentially nonelastic, i.e., in comparison to the upper piston ring flank leg, and has a flat lower piston ring flank. The contact pressure in the axial direction is produced here only by the upper piston ring flank leg. This embodiment has the advantage that the piston ring undergoes little or no twisting, at least as long as it rests against the lower piston ring groove flank.

In another embodiment of the play-free oil scraper ring, the lower (crankcase-side) piston ring flank leg is elastic and tapers inwardly in the radial direction. Here as well, the lower piston ring flank essentially forms a conical surface in an uninstalled state. The upper piston ring flank leg is essentially nonelastic, i.e., in comparison to the lower piston ring flank leg, and has a flat upper piston ring flank. The contact pressure in the axial direction is produced here only by the lower piston ring flank leg. This embodiment has the advantage that the piston ring undergoes little or no twisting, at least as long as it rests against the upper piston ring groove flank.

In another embodiment of the play-free oil scraper ring, the scraper ring also includes an annular spring or expander spring that is situated in the piston ring between the lower piston ring flank leg and the upper piston ring flank leg, and that presses the oil scraper ring radially outwardly. The form-filling capability of the oil scraper ring is increased here by an expander spring.

In an additional embodiment of the play-free oil scraper ring, the lower piston ring flank leg has a lower piston ring flank leg inner face that has a conical shape and a taper angle between 5° and 45°, preferably between 10° and 40°, more preferably between 15 and 35°. As a result of this angle, use is made of the elastic force of the outwardly pressing expander spring to push the lower piston ring flank leg outwardly in the axial direction.

In another embodiment of the play-free oil scraper ring, the upper piston ring flank leg has an upper piston ring flank leg inner face that has a conical shape and a taper angle between 5° and 45°, preferably between 10° and 40°, more preferably between 15 and 35°. As a result of this angle, use is made of the elastic force of the outwardly pressing expander spring to push the upper piston ring flank leg outwardly in the axial direction.

In another embodiment of the play-free oil scraper ring, the annular spring is in contact only with piston ring flank leg inner faces, wherein a running surface leg inner face is not contacted by the annular spring.

In another embodiment of the play-free oil scraper ring, the annular spring is designed as a tube spring. Tube springs are especially suitable as annular springs, and in particular as expander springs for the play-free oil scraper ring, since they are also able to move inside the piston ring, thereby avoiding one-sided wear.

Another exemplary embodiment of the play-free oil scraper ring includes an abutment having a design that is stepped or inclined with respect to an axial direction. As a result of this embodiment, the abutment points of the lower and upper scraper webs are offset relative to one another. This embodiment is intended to achieve an improved scraping effect. This embodiment may also prevent impact wear on the cylinder liner caused by limited mobility of the oil scraper ring in the circumferential direction.

In one preferred exemplary embodiment of the play-free oil scraper ring, the upper and/or the lower piston ring flank are/is provided with a bevel at an inner edge. The bevel achieves two technical effects: the installation of the ring is simplified, and the pivot point for a twisting motion is shifted farther outwardly, which reduces the tendency toward twisting.

In another embodiment, bevels are so strongly pronounced that the inner edges are spaced apart by a distance that is less than a width of a piston ring groove for which the piston ring is intended. A distance of the inner edges of the bevels or the bevel from an inner edge of the piston ring flank is less than the width of the piston ring groove for which the piston ring is intended. The piston ring may thus be inserted into a piston ring without having to be compressed in the axial direction.

THE DRAWINGS

The present invention is explained in greater detail below with reference to schematic illustrations of non-limiting embodiments.

FIGS. 2A through 2E illustrate one embodiment of an oil scraper ring according to the invention.

FIGS. 5A and 5B illustrate an oil scraper ring having scraper webs with different diameters.

FIGS. 6A through 6C show a piston ring having only a single scraper ring.

In the description and in the figures, identical or similar reference numerals are used below to denote identical or similar elements and/or components.

DETAILED DESCRIPTION

Figure 1:
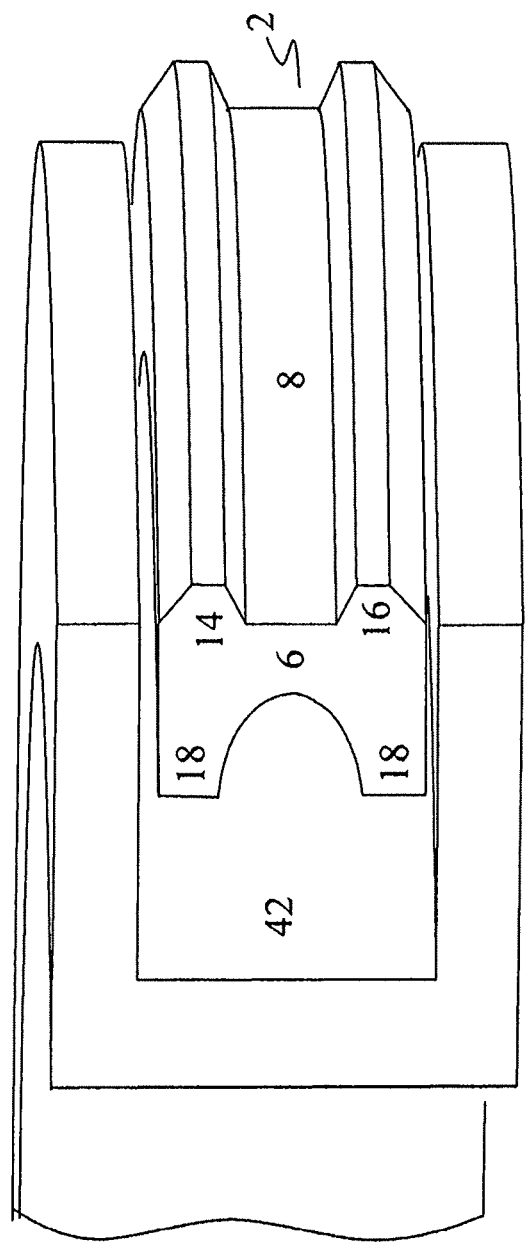
FIG. 1 illustrates a conventional one-part oil scraper ring having two scraper webs.
Figure 2A:
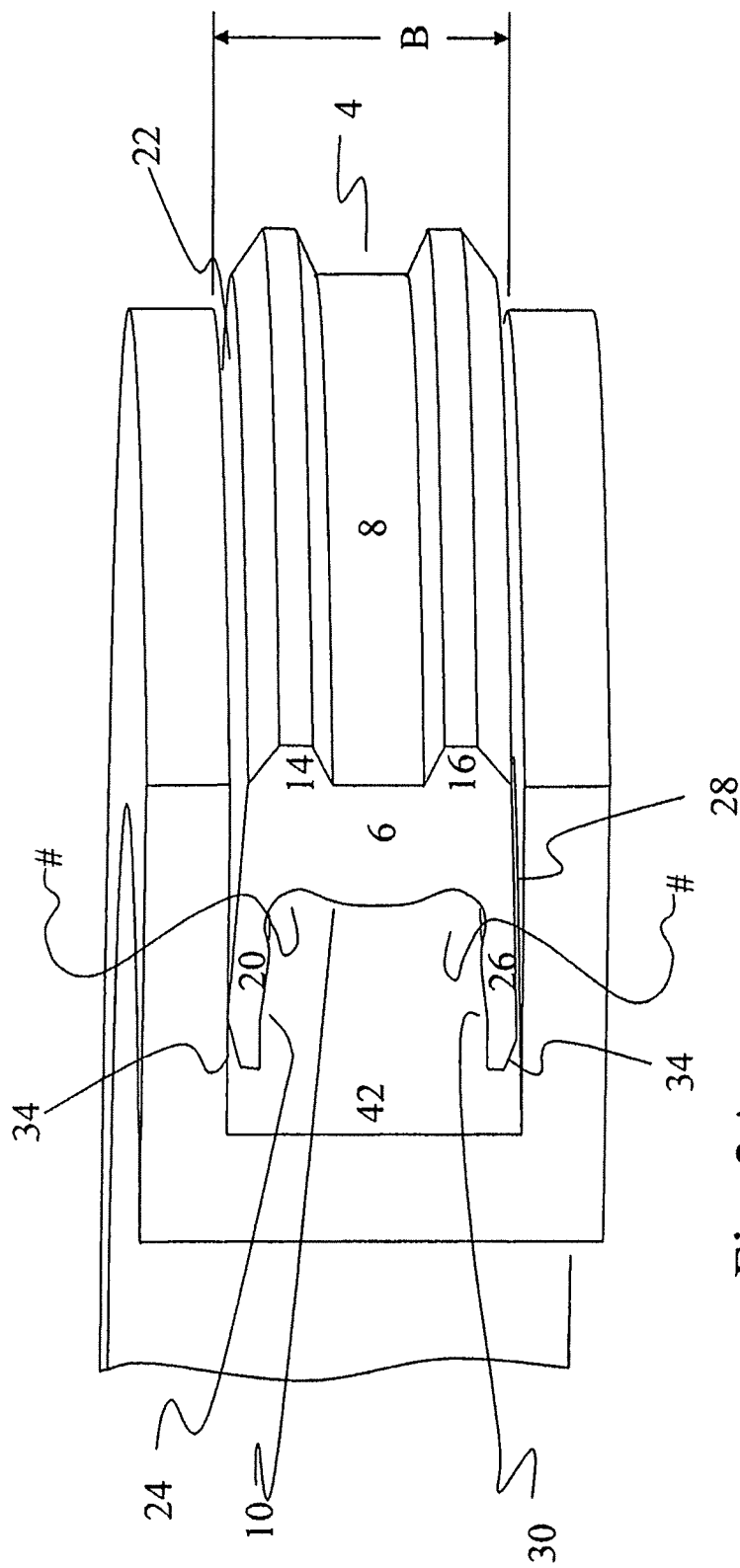

FIG. 1 illustrates a conventional one-part oil scraper ring 2 in a perspective partially sectional view. The oil scraper ring 2 has an essentially U-shaped design. The oil scraper ring 2 has a running surface leg 6 which in the radially outward direction ends in a running surface 8 that is provided with an upper and a lower scraper web 14 and 16, respectively. At the top and the bottom, the running surface leg 6 is joined to piston ring flank legs 18 in the axial direction. Oil channels that conduct the scraped oil inwardly into the piston ring groove 42 are generally situated between the scraper webs 14 and 16. The piston ring 2 does not fill the piston ring groove 42 in the axial direction, so that a certain amount of axial play, i.e., play in the axial direction, is present.

FIGS. 2A through 2D illustrate one embodiment of an oil scraper ring according to the invention. The one-part oil scraper ring 4 according to the invention is illustrated in a perspective partially sectional view in the figures. The oil scraper ring 4 also has an essentially U-shaped design here. The oil scraper ring 4 has a running surface leg 6 which in the radially outward direction ends in a running surface 8 that is provided with an upper and a lower scraper web 14 and 16, respectively. At the top and the bottom, the running surface leg 6 is joined to an upper piston ring flank leg 20 and a lower piston ring flank leg 26 in the axial direction. Oil channels (not illustrated in FIG. 2A) are generally situated between the scraper webs 14 and 16. The upper piston ring flank leg 20 includes an upper piston ring flank 22 and an upper piston ring flank leg inner face 24. The lower piston ring flank leg 26 includes a lower piston ring flank 28 and a lower piston ring flank leg inner face 30. The running surface leg 6 is inwardly delimited by a running surface leg inner face 10. The upper piston ring flank 22 and the lower piston ring flank 28 each form essentially conical faces or truncated cone circumferential faces. In contrast to FIG. 1, each piston ring flank is in contact with the respective piston ring groove flank. This is due to the fact that the piston ring flank legs 20, 26 are pretensioned in the axial direction, as the result of which there is no gap and no axial play between the piston ring flanks and the respective piston ring groove flanks. Accordingly, the piston ring 4 according to the invention is clamped into the piston ring groove 42. However, the clamping forces are lower than the forces exerted by the ring in the axial direction, so that the ring is always able to move in the radial direction, and the axial forces do not significantly limit the form-filling capability. The upper piston ring flank leg inner face 24 on a radially outer side is provided with a recess in order to increase elasticity of the upper piston ring flank leg 20. The lower piston ring flank leg inner face 30 on a radially outer side is likewise provided with a recess in order to increase elasticity of the lower piston ring flank leg 26. The recess acts here similarly to a film hinge or a leaf spring to limit the axial forces exerted by the ends of the piston ring flank leg on the piston ring groove flanks.

FIG. 2B shows only a sectional view of a piston ring according to the invention in a neutral position. The ring is situated, untwisted, in the piston ring groove 42, and with both scraper webs contacts a cylinder inner wall 36. Oil channels are provided at location 38, and are able to convey scraped oil through the piston ring and into the piston ring groove, from where it can flow back into the crankcase. The piston ring according to the invention rests against both piston ring groove flanks simultaneously, only near the ends of the piston ring flank legs, with no axial play on account of zero tolerance 44. The space of the piston ring groove behind the piston ring is sealed off due to this shape.

In FIG. 2C, the piston moves downwardly and the piston ring is positively twisted, since the ring contacts the piston ring groove flank only at a section situated very far radially inwardly. Practically the entire upper piston ring flank 22 rests against the upper piston ring groove flank due to the twisting and the deformation of the piston ring. As a result, the lower scraper web 16 makes stronger contact with the cylinder inner wall 36 and is able to scrape off more oil. The lower piston ring flank in cross section abuts against the lower piston ring groove flank at a point, as the result of which the piston ring groove, except for the abutment, is sealed off along the entire length of the piston ring.

In FIG. 2C, the piston moves from bottom to top and the piston ring is negatively twisted, since the ring contacts the piston ring groove flank only at a section situated very far radially inwardly. Practically the entire lower piston ring flank 22 [sic; 28] rests against the lower piston ring groove flank due to the twisting and the deformation of the piston ring.

As a result, the upper scraper web 14 makes stronger contact with the cylinder inner wall 36 and is able to scrape off more oil. Here as well, the upper piston ring flank in cross section contacts the piston ring groove flank at a point, as the result of which the piston ring groove, except for the abutment, is sealed off along the entire length of the piston ring.

FIG. 2E shows a cross section of the piston ring in an untensioned state. The untensioned overall height H exceeds a width B of the piston ring groove 42. In the untensioned or uncompressed state, however, the axial distance h between the outer inner edges of the piston ring is smaller than the width B of the piston ring groove 42. The bevels may thus be used as inlet bevels, as the result of which the piston ring may be inserted into the piston ring without having to be compressed beforehand in the axial direction.

Figure 3:
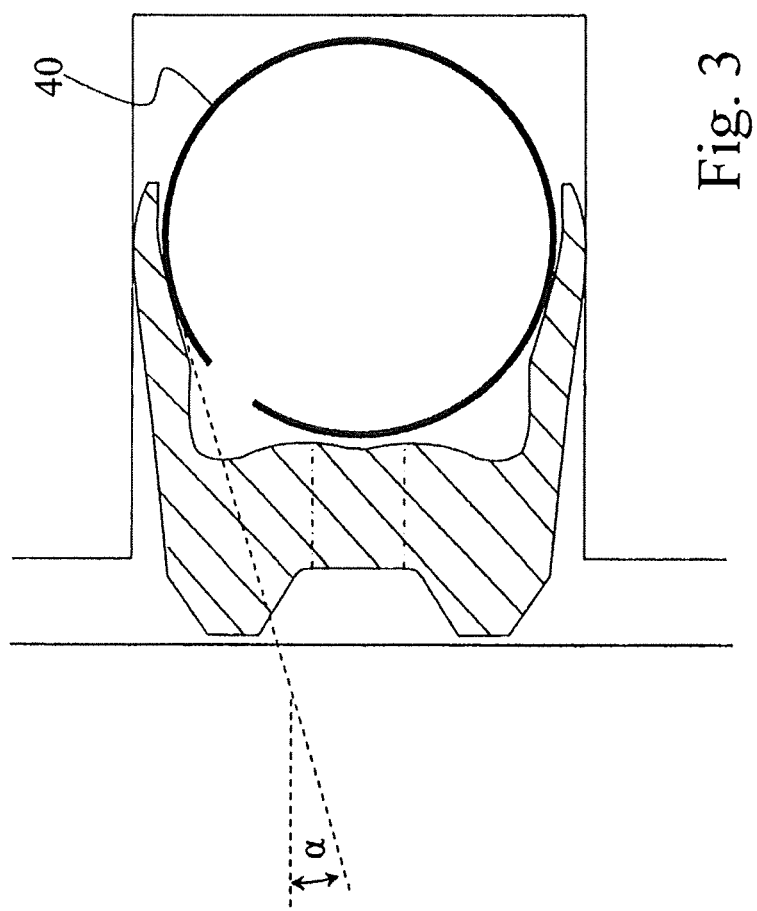
FIG. 3 shows a cross section of an oil scraper ring according to the invention that is additionally provided with an expander spring.

FIG. 3 shows a cross section of an oil scraper ring according to the invention which is additionally provided with an expander spring 40. The expander spring here is designed as a tube spring that is compressed in the circumferential direction. The diameter of the expander spring is selected in such a way that it presses against the upper piston ring flank leg inner face and the lower piston ring flank leg inner face. The diameter of the expander spring 40 is selected in such a way that it does not contact the running surface leg inner face 10. The upper piston ring flank leg inner face and the lower piston ring flank leg inner face form oblique planes, as the result of which the expander spring can increase the contact pressure of the radially inner piston ring flanks. It is also possible for the diameter of the expander spring 40 to be selected in such a way that it contacts the running surface leg inner face 10 and increases primarily the radial contact pressure of the scraping edges.

Figure 4A:
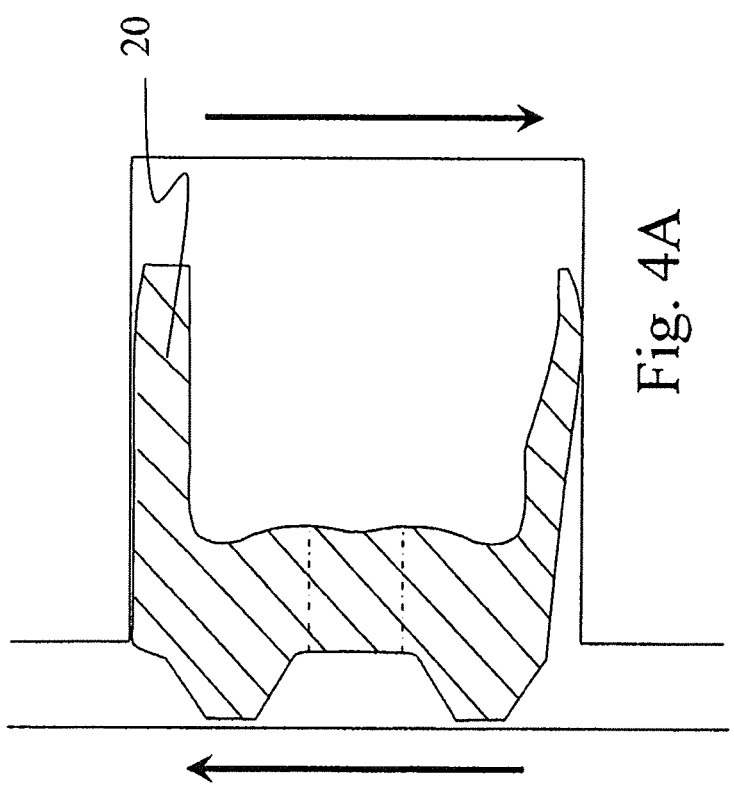
FIGS. 4A and 4B show an embodiment with only one elastic piston ring flank leg.
Figure 4B:
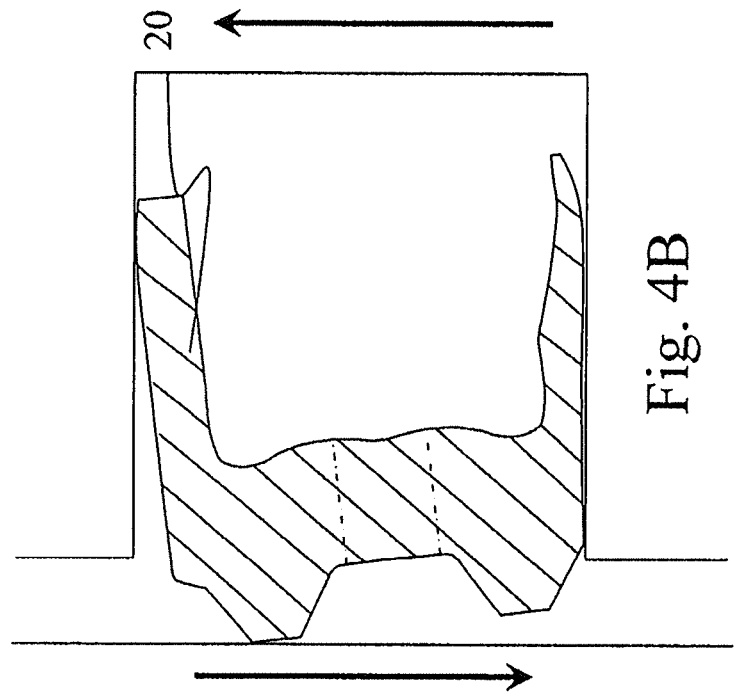

FIGS. 4A and 4B show an embodiment with only one elastic piston ring flank leg. In contrast to the embodiment in FIGS. 2A through 2D, the upper piston ring flank leg 20 is designed as a rigid piston ring flank leg. This embodiment has the advantage that in a situation in which the upper piston ring flank leg 20 rests against the corresponding piston ring groove flank, the ring does not twist. Due to the lack of twist, a setting may be made in which both scraper webs rest against the cylinder inner face during a downward movement (i.e., a movement in the upper half of the stroke). In contrast, when the lower piston ring flank leg 20 rests against the corresponding piston ring groove flank, the ring twists in the same manner as the ring illustrated in FIG. 2D. This version allows oil to be scraped off with two scraper webs in an upper piston movement and a downward piston movement, whereas during an upward movement and a lower piston movement, only the upper scraper web scrapes oil from the cylinder inner wall.

FIGS. 5A and 5B illustrate an oil scraper ring having scraper webs with different diameters. Thus, the ring illustrated in FIGS. 5A and 5B twists the same way as the ring illustrated in FIGS. 2C and 2D. Due to the different diameters of the scraper webs, an effect similar to that in the embodiment in FIGS. 4A and 4B is achieved, namely, that during a portion of the piston movement essentially only one scraper web, i.e., the upper scraper web 14, is active, and in another portion of the piston movement both scraper webs, the upper and lower scraper webs 14, 16, scrape oil from the cylinder inner wall.

FIGS. 6A through 6C show a piston ring with only a single scraper ring 18. The scraper ring 18 is centrally situated on the running surface, and the oil channels are situated below the scraper web 18 and extend from the running surface to the running surface leg inner face. Here as well, the scraper web may have a roof-shaped design in order to achieve different scraping effects during the various motion phases of the piston ring.

In addition, all combinations of features that are shown only individually in single figures are to be regarded as disclosed, provided that they fall under the scope of protection of the claims.

The invention claimed is:

1. A play-free oil scraper ring, a cross section of which comprises:
   a running surface leg having at least one scraper web that is situated on a running surface,
   an upper piston ring flank leg that is connected to the running surface leg, and an upper surface of which forms an upper piston ring flank,
   a lower piston ring flank leg that is connected to the running surface leg, and a lower surface of which forms a lower piston ring flank,
   wherein the uninstalled oil scraper ring has an axial height (H) that exceeds a width (B) of a piston ring groove for which the piston ring is intended,
   wherein the oil scraper ring includes an expander spring that is situated in the oil scraper ring between the lower piston ring flank leg and the upper piston ring flank leg, and that presses the oil scraper ring radially outwardly,
   wherein the lower piston ring flank leg has a lower piston ring flank leg inner face and the upper piston ring flank leg has an upper piston ring flank leg inner face,
   wherein the lower piston ring flank leg inner face has a conical shape and a taper angle ($\alpha$) between 10° and 40°, and/or the upper piston ring flank leg inner face has a conical shape and a taper angle ($\alpha$) between 10° and 40°,
   wherein the expander spring is in contact only with piston ring flank leg inner faces and does not contact a running surface leg inner face,
   wherein the upper piston ring flank leg tapers inwardly in the radial direction,
   wherein the upper piston ring flank, in an uninstalled state, essentially forms a conical surface, and
   wherein the lower piston ring flank is flat.

2. The play-free oil scraper ring according to claim 1, wherein the oil scraper ring is provided with oil channels situated below the at least one scraper web.

3. The play-free oil scraper ring according to claim 1, wherein the at least one scraper web comprises two scraper webs, an upper scraper web and a lower scraper web, wherein the upper scraper web has a larger diameter than the lower scraper web.

4. The play-free oil scraper ring according to claim 3, wherein the oil scraper ring is provided with oil channels situated between the upper and the lower scraper webs.

5. The play-free oil scraper ring according to claim 1, wherein the expander spring is a tube spring.

6. The play-free oil scraper ring according to claim 1, further comprising an abutment having a design that is stepped or inclined with respect to an axial direction.

7. The play-free oil scraper ring according to claim 1, wherein the upper and/or the lower piston ring flank are/is provided with a bevel at an inner edge.

8. The play-free oil scraper ring according to claim 7, wherein a distance (h) of the inner edges of the bevels or of the inner edge of the bevel from an inner edge of the piston ring flank is less than the width (B) of the piston ring groove for which the piston ring is intended.

9. A play-free oil scraper ring, a cross section of which comprises:
- a running surface leg having at least one scraper web that is situated on a running surface,
- an upper piston ring flank leg that is connected to the running surface leg, and an upper surface of which forms an upper piston ring flank,
- a lower piston ring flank leg that is connected to the running surface leg, and a lower surface of which forms a lower piston ring flank,
- wherein the uninstalled oil scraper ring has an axial height (H) that exceeds a width (B) of a piston ring groove for which the piston ring is intended,
- wherein the oil scraper ring includes an expander spring that is situated in the oil scraper ring between the lower piston ring flank leg and the upper piston ring flank leg, and that presses the oil scraper ring radially outwardly,
- wherein the lower piston ring flank leg has a lower piston ring flank leg inner face and the upper piston ring flank leg has an upper piston ring flank leg inner face,
- wherein the lower piston ring flank leg inner face has a conical shape and a taper angle ($\alpha$) between 10° and 40°, and/or the upper piston ring flank leg inner face that has a conical shape and a taper angle ($\alpha$) between 10° and 40°,
- wherein the expander spring is in contact only with piston ring flank leg inner faces and does not contact a running surface leg inner face,
- wherein the lower piston ring flank leg tapers inwardly in the radial direction,
- wherein the lower piston ring flank in an uninstalled state essentially forms a conical surface,
- wherein the lower piston ring flank leg has a lower piston ring flank leg inner face that has a conical shape and a taper angle ($\alpha$) between 10° and 40°, and
- wherein the upper piston ring flank is flat.

10. The play-free oil scraper ring according to claim 9, wherein the oil scraper ring is provided with oil channels situated below the at least one scraper web.

11. The play-free oil scraper ring according to claim 9, wherein the at least one scraper web comprises two scraper webs, an upper scraper web and a lower scraper web, wherein the upper scraper web has a larger diameter than the lower scraper web.

12. The play-free oil scraper ring according to claim 11, wherein the oil scraper ring is provided with oil channels situated between the upper and the lower scraper webs.

13. The play-free oil scraper ring according to one of claim 9, wherein the expander spring is a tube spring.

14. The play-free oil scraper ring according to claim 9, further comprising an abutment having a design that is stepped or inclined with respect to an axial direction.

15. The play-free oil scraper ring according to claim 9, wherein the upper and/or the lower piston ring flank are/is provided with a bevel at an inner edge.

16. The play-free oil scraper ring according to claim 15, wherein a distance (h) of the inner edges of the bevels or of the inner edge of the bevel from an inner edge of the piston ring flank is less than the width (B) of the piston ring groove for which the piston ring is intended.

* * * * *